(12) United States Patent
Suzuki

(10) Patent No.: US 10,890,146 B2
(45) Date of Patent: Jan. 12, 2021

(54) FUEL SUPPLY APPARATUS

(71) Applicant: KYOSAN DENKI CO., LTD., Koga (JP)

(72) Inventor: Masakazu Suzuki, Koga (JP)

(73) Assignee: KYOSAN DENKI CO., LTD., Koga (JP)

( * ) Notice: Subject to any disclaimer, the term of this patent is extended or adjusted under 35 U.S.C. 154(b) by 0 days.

(21) Appl. No.: 16/511,048

(22) Filed: Jul. 15, 2019

(65) Prior Publication Data
US 2020/0025164 A1 Jan. 23, 2020

(30) Foreign Application Priority Data
Jul. 23, 2018 (JP) .................. 2018-137852

(51) Int. Cl.
| | |
|---|---|
| *F02M 37/00* | (2006.01) |
| *F02M 37/44* | (2019.01) |
| *F02M 37/10* | (2006.01) |
| *F02M 37/34* | (2019.01) |
| *F02M 37/50* | (2019.01) |
| *F02M 37/14* | (2006.01) |
| *B60K 15/03* | (2006.01) |

(52) U.S. Cl.
CPC ........ *F02M 37/44* (2019.01); *F02M 37/0076* (2013.01); *F02M 37/10* (2013.01); *F02M 37/14* (2013.01); *F02M 37/34* (2019.01); *F02M 37/50* (2019.01); *B60K 15/03* (2013.01); *B60K 2015/03236* (2013.01); *B60K 2015/03243* (2013.01); *B60K 2015/03256* (2013.01)

(58) Field of Classification Search
CPC ........ F02M 37/44; F02M 37/10; F02M 37/34; F02M 37/50; F02M 37/0076; B60K 2015/03256; B60K 2015/03243; B60K 2015/03236; B60K 15/03
See application file for complete search history.

(56) References Cited

U.S. PATENT DOCUMENTS

| | | | | | |
|---|---|---|---|---|---|
| 3,418,991 | A | * | 12/1968 | Gelenius | ................ B60K 15/00 123/179.1 |
| 4,340,023 | A | * | 7/1982 | Creager | ............. F02M 37/0082 123/510 |
| 5,415,146 | A | * | 5/1995 | Tuckey | .............. B01D 35/0273 123/509 |

(Continued)

FOREIGN PATENT DOCUMENTS

JP 2013-213490 A 10/2013

*Primary Examiner* — Phutthiwat Wongwian
*Assistant Examiner* — Sherman D Manley
(74) *Attorney, Agent, or Firm* — Harness, Dickey & Pierce, P.L.C.

(57) ABSTRACT

A fuel supply apparatus includes a fuel pump, a filter element, and a passage element. The fuel pump is transversely arranged inside a fuel tank to discharge fuel sucked from a suction port. The filter element defines an inner space communicated with the suction port inside the fuel tank to filter the fuel. The passage element defines an inner passage inside the fuel tank to introduce the fuel from the inner space into the suction port through the inner passage. The suction port is located to be deviated toward one end of the filter element in a specific lateral direction. The inner passage is communicated with the inner space, and extends from the suction port toward a center of the filter element in the specific lateral direction.

12 Claims, 8 Drawing Sheets

(56) References Cited

U.S. PATENT DOCUMENTS

| | | | | |
|---|---|---|---|---|
| 5,647,329 A * | 7/1997 | Bucci | ............... | B01D 35/0273 |
| | | | | 123/509 |
| 6,439,417 B1 * | 8/2002 | Arase | ............... | B60K 15/03 |
| | | | | 137/395 |
| 6,609,503 B1 * | 8/2003 | Nakagawa | ............... | B62J 35/00 |
| | | | | 123/509 |
| 7,628,143 B2 * | 12/2009 | Yamada | ............... | F02M 37/106 |
| | | | | 123/509 |
| 8,372,278 B1 * | 2/2013 | Nguyen | ............... | B01D 35/0273 |
| | | | | 210/172.2 |
| 9,915,234 B2 * | 3/2018 | Ishitoya | ............... | F02M 37/106 |
| 10,436,161 B2 * | 10/2019 | Kim | ............... | F02M 37/14 |
| 2003/0015537 A1 * | 1/2003 | Konja | ............... | B60K 15/077 |
| | | | | 220/563 |
| 2007/0062493 A1 * | 3/2007 | Crary | ............... | F02M 37/106 |
| | | | | 123/509 |
| 2008/0245724 A1 * | 10/2008 | Oku | ............... | F02M 37/106 |
| | | | | 210/416.4 |
| 2009/0230674 A1 * | 9/2009 | Villaire | ............... | F02M 37/106 |
| | | | | 285/179 |
| 2010/0116367 A1 * | 5/2010 | Wierer | ............... | F02M 37/106 |
| | | | | 137/605 |
| 2011/0002798 A1 * | 1/2011 | Ford | ............... | B60K 15/077 |
| | | | | 417/410.1 |
| 2011/0192786 A1 * | 8/2011 | Nagai | ............... | F02M 37/34 |
| | | | | 210/443 |
| 2013/0233285 A1 * | 9/2013 | Yamada | ............... | F02M 37/106 |
| | | | | 123/514 |
| 2014/0096849 A1 * | 4/2014 | Akagi | ............... | B01D 29/11 |
| | | | | 137/545 |
| 2014/0116547 A1 * | 5/2014 | Honda | ............... | F02M 37/44 |
| | | | | 137/565.37 |
| 2017/0341510 A1 * | 11/2017 | Kono | ............... | F02M 37/0076 |
| 2018/0209386 A1 * | 7/2018 | Hayashi | ............... | B01D 35/02 |

\* cited by examiner

FUEL SUPPLY APPARATUS

CROSS REFERENCE TO RELATED APPLICATION

This application is based on Japanese Patent Application No. 2018-137852 filed on Jul. 23, 2018, the disclosure of which is incorporated herein by reference in its entirety.

TECHNICAL FIELD

The present disclosure relates to a fuel supply apparatus.

BACKGROUND

A fuel supply apparatus includes: a fuel pump which discharges fuel sucked from a fuel tank; and a filter element filtering the fuel.

SUMMARY

According to an aspect of the present disclosure, a fuel supply apparatus supplies fuel from a fuel tank in a vehicle. The fuel supply apparatus includes: a fuel pump transversely arranged inside the fuel tank to discharge fuel sucked from a suction port; a filter element that defines an inner space communicated with the suction port inside the fuel tank to filter the fuel passing from the fuel tank toward the inner space; and a passage element that defines an inner passage inside the fuel tank to introduce the fuel from the inner space into the suction port through the inner passage. The suction port is located to be deviated toward one end of the filter element in a specific lateral direction. The inner passage is communicated with the inner space, and extends from the suction port toward a center of the filter element in the specific lateral direction.

DETAILED DESCRIPTION

Figure 1:
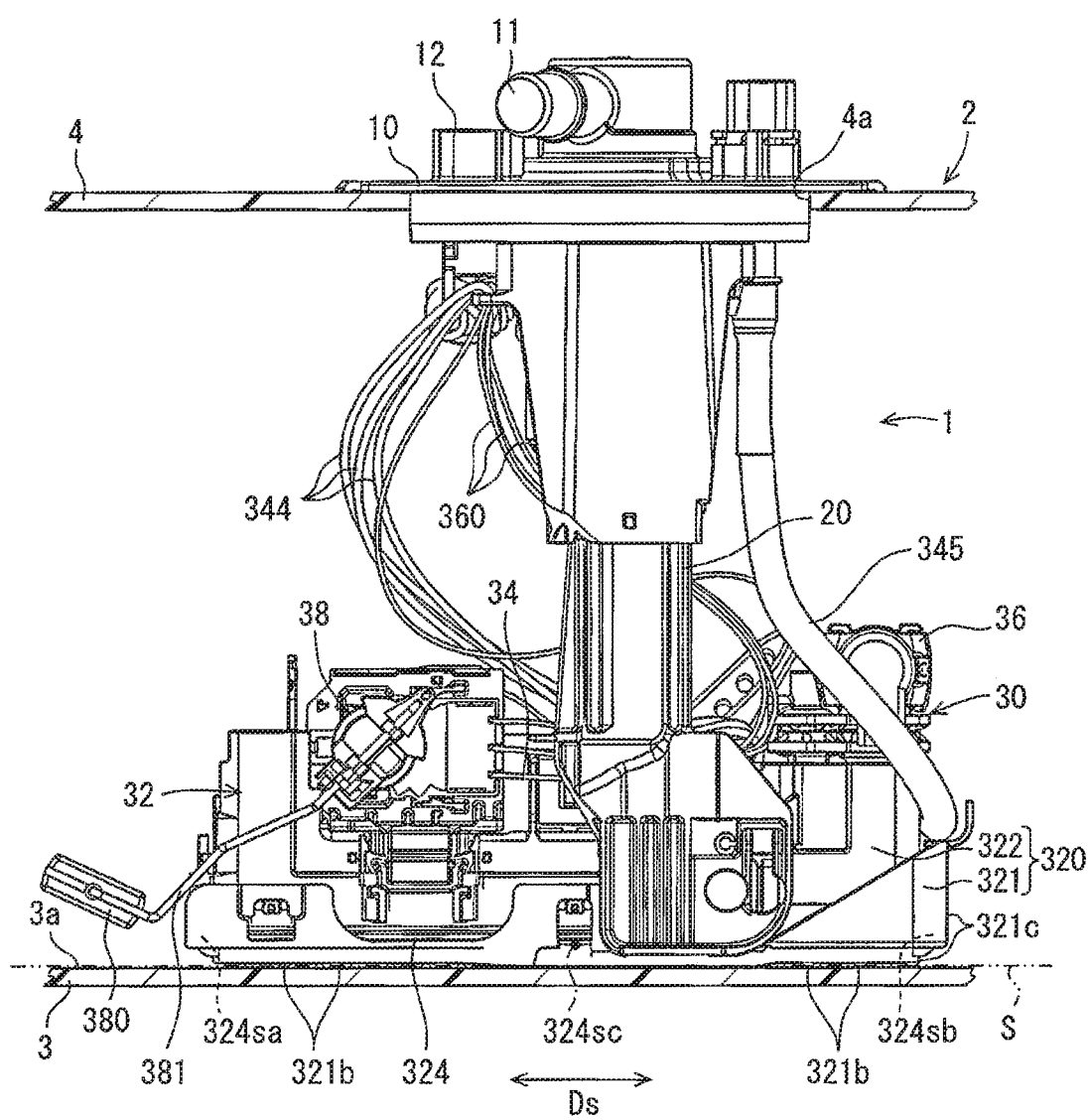
FIG. 1 is a partial sectional front view of a fuel supply apparatus according to a first embodiment.

To begin with, examples of relevant techniques will be described.

A conventional fuel supply apparatus includes: a fuel pump which discharges fuel sucked through a suction port from a fuel tank; and a filter element disposed to define an inner space where the suction port is open inside the fuel tank. Accordingly, the fuel is filtered by passing through the filter element from the inside of the fuel tank toward the inner space and then sucked into the suction port.

In this comparison example, a suction port is deviated to one end side from a center in a specific lateral direction in the filter element.

In recent years, the fuel supply apparatus is downsized in the height direction by transversely mounting a fuel pump in response to a demand for a flat fuel tank in a vehicle. When the fuel pump is transversely arranged in the fuel supply apparatus, it is preferred that the suction port be largely deviated to one end side in the specific lateral direction in the filter element. However, for example, during a turn of the vehicle or acceleration or deceleration of the vehicle, the entire filter element is exposed from a fuel level by an inclination of the fuel level with respect to the specific lateral direction, due to a tilt of the fuel caused by the action of the inertial force inside the fuel tank. Further, inside the fuel tank tilted together with the vehicle, the entire filter element is exposed from the fuel level due to the inclination of the fuel level with respect to the specific lateral direction.

When the entire filter element is exposed from the fuel, an area where fuel can be sucked into the suction port is limited to the side on which the fuel level is lowered relative to the suction port in the specific lateral direction in the inner space. When the state of the inclination of the fuel level relative to the specific lateral direction (hereinbelow, merely referred to as the inclination) changes, the size of the fuel suckable area is increased or reduced. As a result, when the side on which the inclined fuel level is lowered corresponds to the side to which the suction port is deviated, fuel that can be sucked into the suction port is likely to be exhausted by a large reduction in the size of the fuel suckable area. Thus, there is a fear of a fuel supply failure.

The present disclosure provides a fuel supply apparatus that prevents a fuel supply failure.

According to an aspect of the present disclosure, a fuel supply apparatus supplies fuel from a fuel tank in a vehicle. The fuel supply apparatus includes: a fuel pump transversely arranged inside the fuel tank to discharge fuel sucked from a suction port; a filter element that defines an inner space communicated with the suction port inside the fuel tank to filter the fuel passing toward the inner space; and a passage element that defines an inner passage inside the fuel tank to introduce the fuel from the inner space into the suction port through the inner passage. The suction port is located to be deviated toward one end of the filter element in a specific lateral direction. The inner passage is communicated with the inner space, and extends from the suction port toward a center of the filter element in the specific lateral direction.

In this manner, the inner passage which is defined by the passage element in the filter element extends from the suction port of the fuel pump, which is deviated toward the one end of the filter element in the specific lateral direction.

The inner passage extends toward the center in the specific lateral direction, and is open in the inner space. Accordingly, when the entire filter element is exposed from the fuel level inclined with respect to the specific lateral direction, it is possible to reduce a size difference in a fuel suckable area which is limited to the side on which the fuel level is lowered in the specific lateral direction in the inner space. This is based on that the size of the fuel suckable area is determined according to the distance from a part on the center side where the inner passage is open to each of the one end and the other end in the filter element even when an inclination state of the fuel level changes with respect to the specific lateral direction. Accordingly, it is possible to secure fuel that can be sucked into the suction port through the inner passage to prevent exhaustion of the fuel that can be sucked. Thus, it is possible to prevent a fuel supply failure.

The fuel supply apparatus may further include a pressure regulating valve that regulates a pressure of the fuel discharged from the fuel pump. The fuel pump is deviated toward the one end of the filter element in the specific lateral direction, and the pressure regulating valve is deviated toward the other end of the filter element in the specific lateral direction.

In this manner, the fuel pump and the pressure regulating valve located on the discharge side of the fuel pump are respectively disposed in a deviated manner on the one end side and the other end side of the filter element in the specific lateral direction. In this case, the suction port is positioned as deviated on the one end side in the lateral direction, which is opposite to the side to which the pressure regulating valve is deviated. However, according to the inner passage as described above, it is possible to secure fuel that can be sucked into the suction port to prevent a fuel supply failure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As illustrated in FIG. 1, a fuel supply apparatus 1 according to a first embodiment is mounted on a fuel tank 2 of a vehicle. The fuel supply apparatus 1 supplies fuel inside the fuel tank 2 to the outside of the fuel tank 2. The fuel tank 2 includes a bottom plate 3 with an inner bottom face 3a, which corresponds to a horizontal reference plane S that three-dimensionally expands in a horizontal direction, when the vehicle is on a horizontal plane. The horizontal reference plane S in the fuel tank 2 is assumed as a virtual plane expanding in the horizontal direction in the vehicle on the horizontal plane. A right-left direction in FIGS. 1, 3, 5 to 7, and 9 to 11 and an up-down direction in FIGS. 6, 10, and 11 indicate the horizontal direction in the vehicle on the horizontal plane. An up-down direction in FIGS. 1, 3, 5, 7, and 9 indicates a vertical direction in the vehicle on the horizontal plane.

First, the entire configuration of the fuel supply apparatus 1 will be described.

Figure 2:
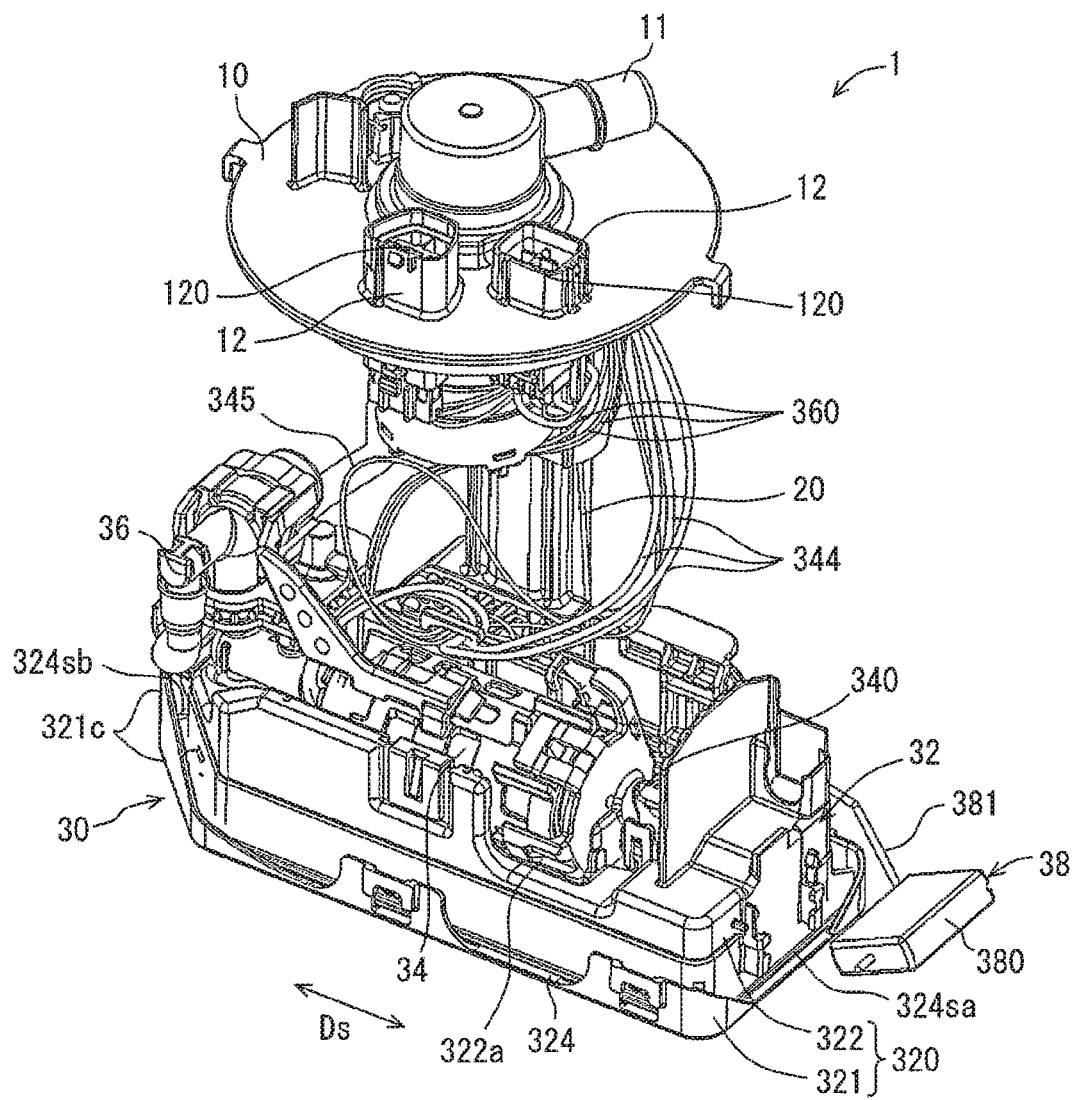
FIG. 2 is a perspective view of the fuel supply apparatus according to the first embodiment.

As illustrated in FIGS. 1 and 2, the fuel supply apparatus 1 includes a tank lid 10, a coupling strut 20, and a pump unit 30. The tank lid 10 is made of resin and formed in a discoid shape. The tank lid 10 is attached to a top plate 4 which covers the inside of the fuel tank 2 from the upper side. The tank lid 10 closes a through hole 4a which penetrates the top plate 4.

The tank lid 10 integrally includes a fuel supply pipe 11 and an electric connector 12. The fuel supply pipe 11 communicates with the pump unit 30 inside the fuel tank 2. The fuel supply pipe 11 communicates with a fuel path to an internal combustion engine which is mounted on the vehicle outside the fuel tank 2. The pump unit 30 supplies fuel inside the fuel tank 2 to the internal combustion engine outside the fuel tank 2 through the fuel supply pipe 11. Many metal terminals 120 are buried in the electric connector 12. Each of the metal terminals 120 is electrically connected to an external control circuit outside the fuel tank 2.

The coupling strut 20 is housed below the tank lid 10 inside the fuel tank 2. The coupling strut 20 is made of resin. The coupling strut 20 is formed in a longitudinal rectangular rod-like shape. The coupling strut 20 extends in the up-down direction to couple the tank lid 10 and the pump unit 30 to each other.

The pump unit 30 is housed below the tank lid 10 inside the fuel tank 2. The pump unit 30 includes a unit body 32, a fuel pump 34, a pressure regulating valve 36, and a liquid level detecting module 38. The unit body 32 has a flat rectangular box shape as a whole. The unit body 32 is disposed on the inner bottom face 3a inside the fuel tank 2. The unit body 32 has a cover element 320 and a filter element 324. The cover element 320 includes a lower member 321 and an upper member 322 which are combined together.

Figure 3:
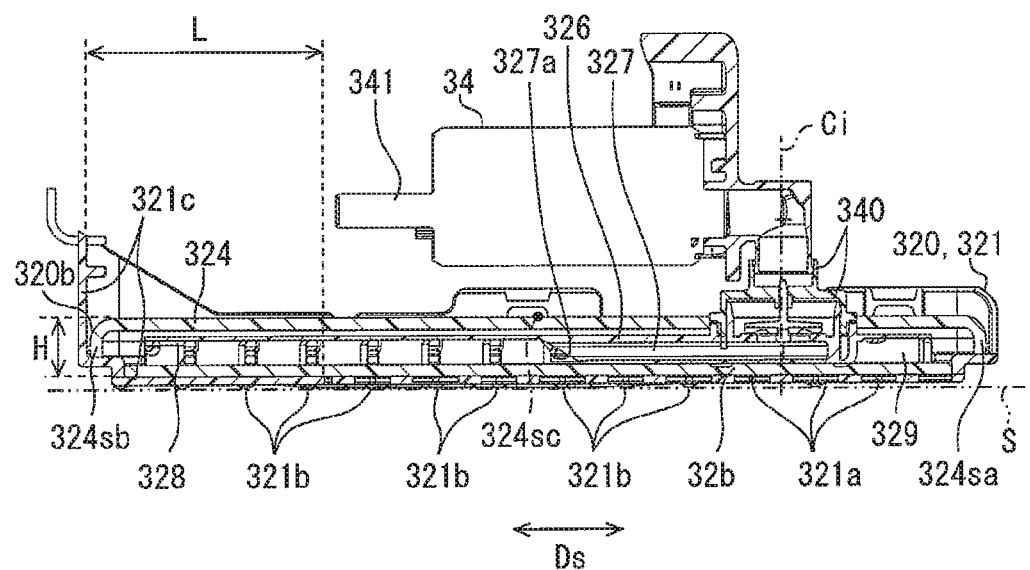
FIG. 3 is a sectional view of a unit body of the first embodiment.
Figure 4:
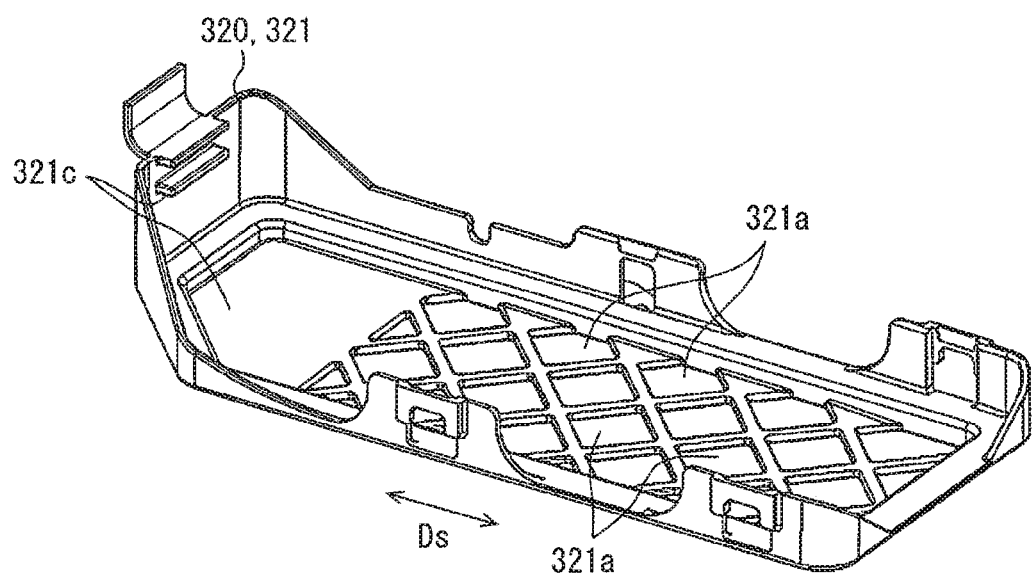
FIG. 4 is a perspective view of a lower member of the first embodiment.
Figure 5:
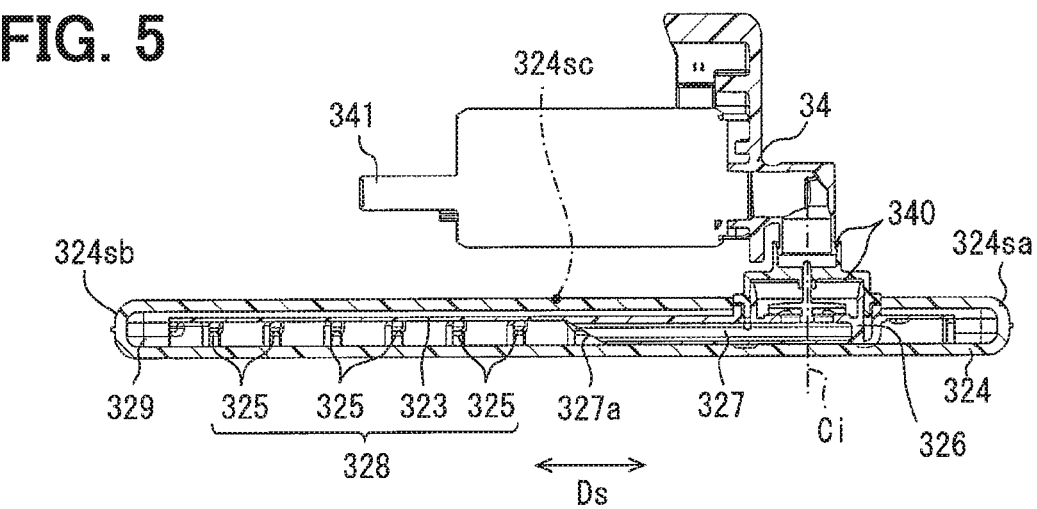
FIG. 5 is a sectional view of a filter element and a fuel pump of the first embodiment.

The lower member 321 illustrated in FIGS. 1, 3, and 4 is made of resin. The lower member 321 is formed in a bottomed rectangular dish shape. Plural inflow holes 321a are formed on the lower part of the lower member 321. Each of the inflow holes 321a has a shape penetrating the lower member 321 in the up-down direction. Plural projections 321b are formed on the lower part of the lower member 321. Each of the projections 321b has a shape projecting downward. Each of the projections 321b is in contact with the inner bottom face 3a of the fuel tank 2 from the upper side to form an inflow clearance between the lower member 321 and the inner bottom face 3a. The fuel inside the fuel tank 2 flows into the inflow holes 321a through the inflow clearance.

The upper member 322 illustrated in FIGS. 1 and 2 is made of resin. The upper member 322 has an inverted bottomed rectangular dish shape. The outer peripheral edge part of the upper member 322 is fixed to the outer peripheral edge part of the lower member 321 so that a housing space for housing the filter element 324 is formed inside the cover element 320. At least one inflow hole 322a is formed on the upper part of the upper member 322. The inflow hole 322a has a shape penetrating the upper member 322 in the up-down direction. The fuel inside the fuel tank 2 flows into the inflow hole 322a.

The filter element 324 illustrated in FIGS. 1 to 3 and 5 to 8 is made of a material capable of exhibiting a filtering function such as a porous resin, a woven fabric, a nonwoven fabric, a resin mesh, or/and a metal mesh. The filter element 324 has a flat rectangular bag shape so as to define an inner space 329 inside the fuel tank 2. The filter element 324 has a trapezoidal outline in both plan view from the upper side and plan view from the lower side. The filter element 324 is disposed along the horizontal reference plane S in the housing space inside the cover element 320 to be covered with the cover element 320 from upper, lower, and lateral sides. The outer peripheral edge of the filter element 324 is held between the outer peripheral edge part of the lower member 321 and the outer peripheral edge part of the upper member 322. In the held state, the fuel flowing into the inflow holes 321a, 322a from the inside of the fuel tank 2 is filtered by passing through the filter element 324 from the holes 321a, 322a toward the inner space 329. The clean fuel filtered in this manner is subjected to suction into the fuel pump 34 from the inner space 329 inside the filter element 324.

The fuel pump 34 is, for example, an electric pump such as a vane pump or a trochoid pump. The fuel pump 34 has a longitudinal columnar shape. The fuel pump 34 is held by the upper part of the cover element 320 to be disposed in a manner to extend in the right-left direction of FIGS. 1, 3, and 5 to 7 along the horizontal reference plane S, that is, disposed transversely inside the fuel tank 2. The fuel pump 34 is electrically connected to plural predetermined metal terminals 120 through bendable flexible wires 344 illustrated in FIGS. 1 and 2.

A suction port 340 of the fuel pump 34 illustrated in FIGS. 2, 3, and 5 to 8 is formed by plural resin members. The suction port 340 inserted into the cover element 320 through the inflow hole 322a is mechanically connected to the filter element 324 and is open in the inner space 329. A discharge port 341 of the fuel pump 34 illustrated in FIGS. 3, 5, and 6 communicates with the fuel supply pipe 11 through a bendable flexible tube 345 illustrated in FIGS. 1 and 2. According to the above configuration, the fuel pump 34 is driven in accordance with control by the external control circuit to suck the fuel from the inner space 329 of the filter element 324. The fuel pump 34 pressurizes the fuel sucked in this manner and then discharges the pressurized fuel toward the fuel supply pipe 11.

The pressure regulating valve 36 illustrated in FIGS. 1 and 2 is a mechanical valve such as a pressure regulator. The pressure regulating valve 36 is held by the upper part of the cover element 320 to be disposed near the discharge port 341 of the fuel pump 34. The pressure regulating valve 36 communicates with the discharge port 341 and the flexible tube 345. The pressure regulating valve 36 regulates the pressure of the discharged fuel flowing from the discharge port 341 toward the fuel supply pipe 11.

The liquid level detecting module 38 is a so-called sender gauge including a resin float 380 and a metal arm 381. The liquid level detecting module 38 is held by a lateral part of the cover element 320 to be disposed on the lateral side of the fuel pump 34. The liquid level detecting module 38 is electrically connected to plural predetermined metal terminals 120 through bendable flexible wires 360. According to the above configuration, in the liquid level detecting module 38, the resin float 380 floating on the fuel inside the fuel tank 2 moves up and down to rotate the metal arm 381. A rotation position of the metal arm 381 corresponds to a liquid level of the fuel inside the fuel tank 2. Thus, the liquid level detecting module 38 detects the liquid level corresponding to the rotation position of the metal arm 381 in accordance with control by the external control circuit and outputs a detection signal indicating a result of the detection to the external control circuit.

Next, the detailed configuration of the fuel supply apparatus 1 will be described.

The right-left direction in FIGS. 1, 3, 5 to 7, and 9 to 11 along the horizontal reference plane S of the fuel tank 2 in the unit body 32 of the fuel supply apparatus 1 is assumed as a specific lateral direction Ds which corresponds to the longitudinal direction of the elements 324, 320 and the fuel pump 34. On the above assumption, as illustrated in FIGS. 1 to 3 and 5 to 8, the fuel pump 34 is deviated toward one end 324sa in the specific lateral direction Ds in the filter element 324. Accordingly, in the fuel pump 34, a center line Ci of the suction port 340 illustrated in FIGS. 3, 5 to 7, and 9 to 11 is deviated toward the one end 324sa in the specific lateral direction Ds in the filter element 324 from a center 324sc in the specific lateral direction Ds in the filter element 324. On the other hand, as illustrated in FIGS. 1 and 2, the pressure regulating valve 36 is deviated toward the other end 324sb in the specific lateral direction Ds in the filter element 324. Accordingly, the entire pressure regulating valve 36 is deviated toward the other end 324sb in the specific lateral direction Ds in the filter element 324 from the center 324sc in the specific lateral direction Ds in the filter element 324.

Figure 6:
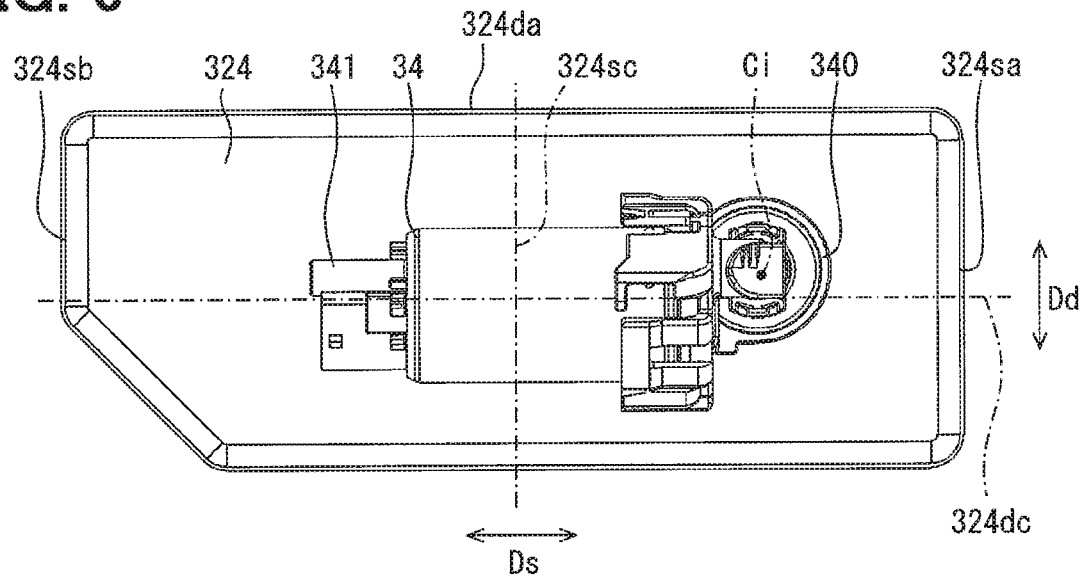
FIG. 6 is a top view of the filter element and the fuel pump of the first embodiment.
Figure 7:
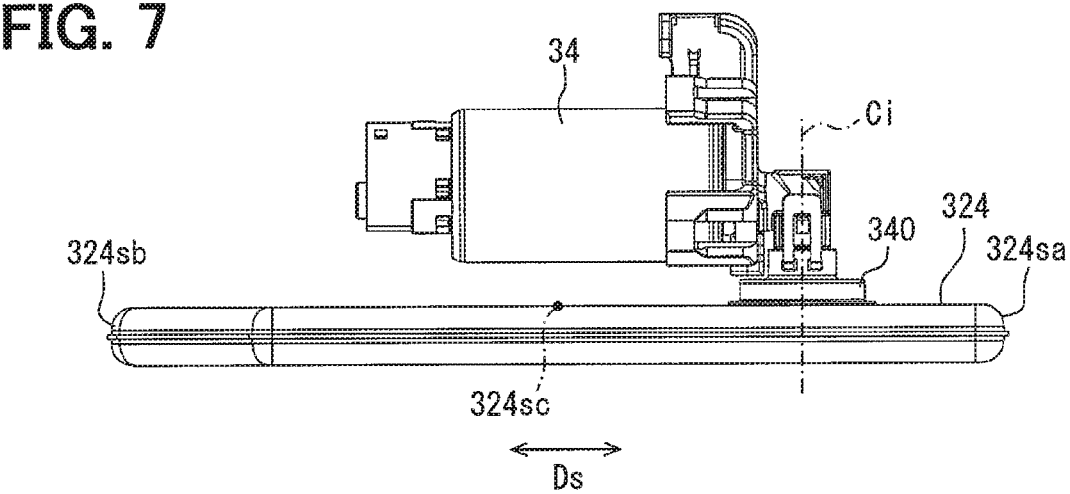
FIG. 7 is a side view of the filter element and the fuel pump of the first embodiment.
Figure 8:
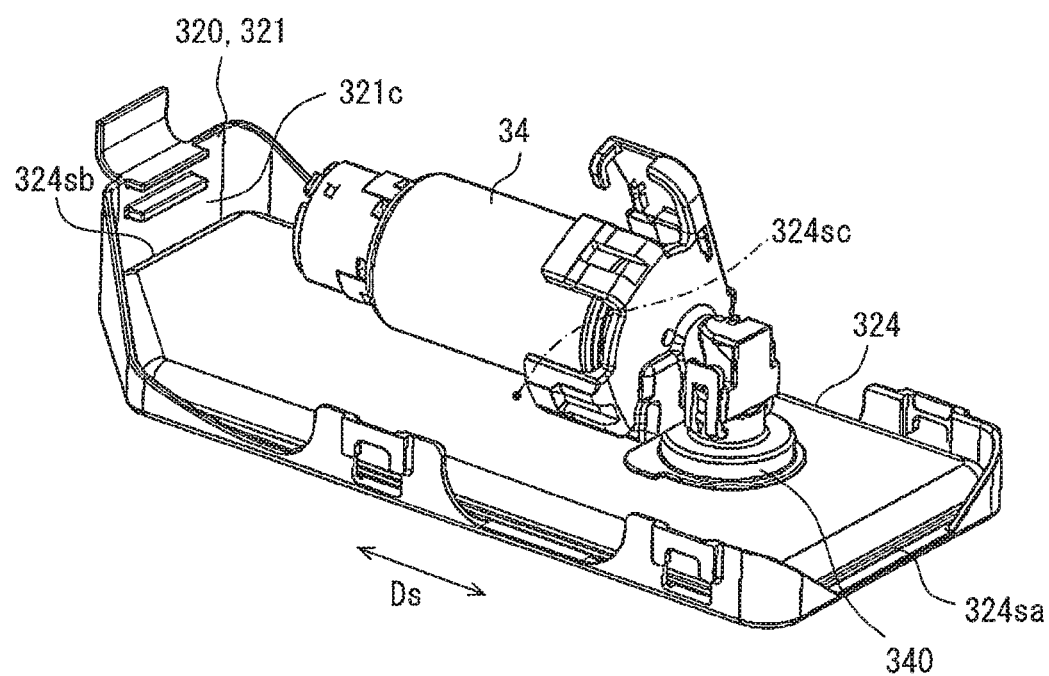
FIG. 8 is a perspective view of the unit body of the first embodiment.
Figure 9:
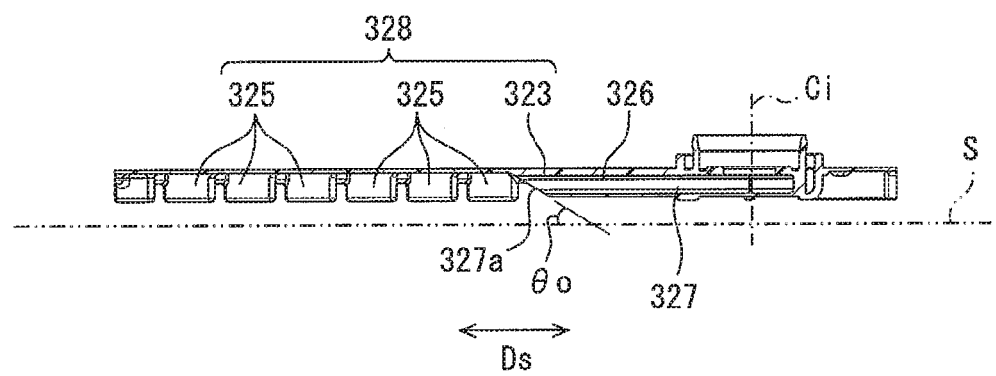
FIG. 9 is a sectional view of the filter element of the first embodiment.
Figure 10:
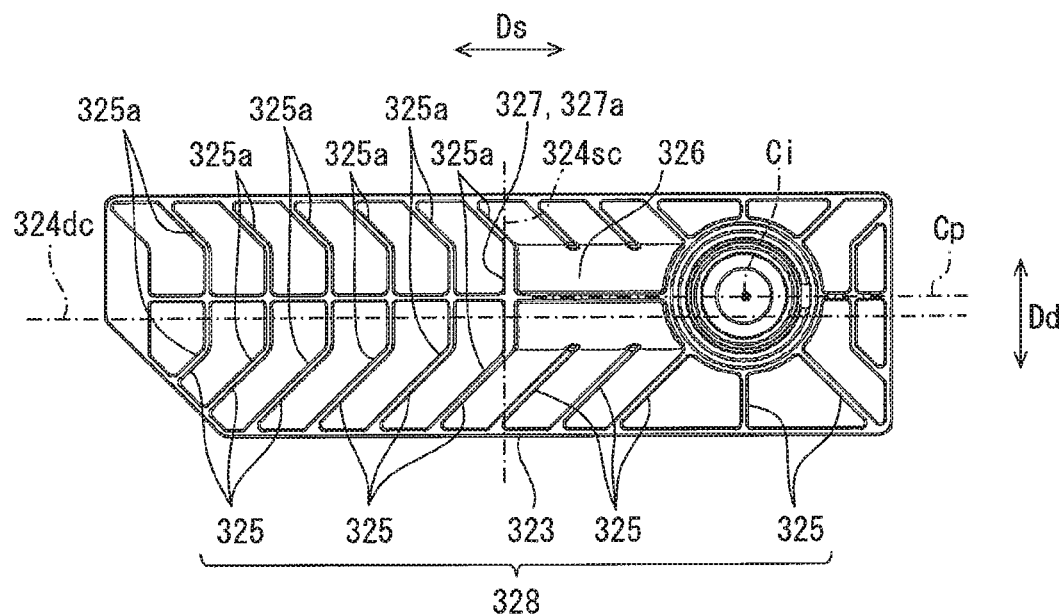
FIG. 10 is a top view of the filter element of the first embodiment.
Figure 11:
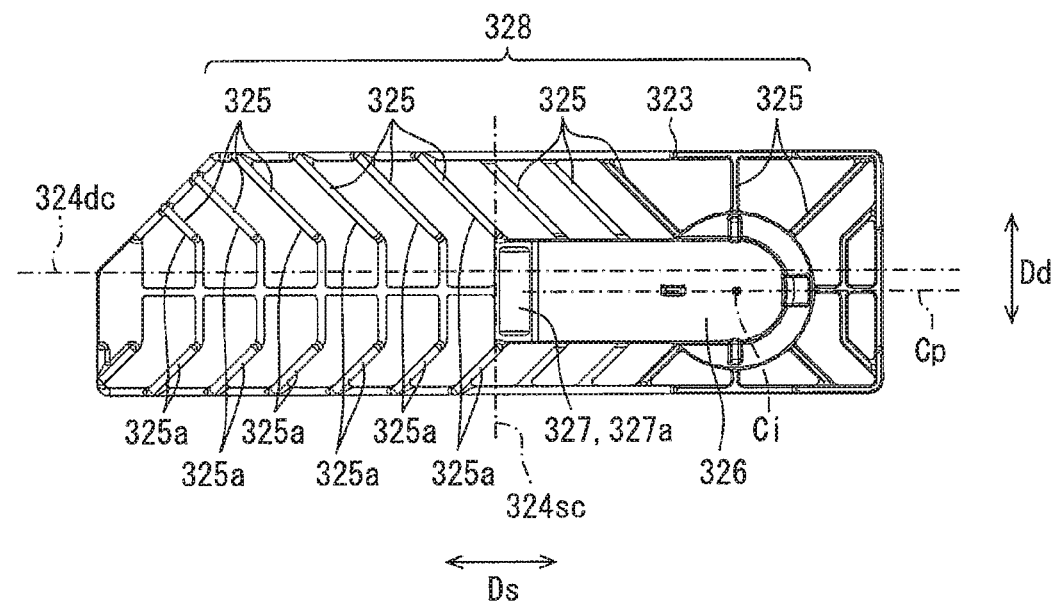
FIG. 11 is a bottom view of the filter element of the first embodiment.

The up-down direction in FIGS. 6, 10, and 11 along the horizontal reference plane S of the fuel tank 2 in the unit body 32 is assumed as an orthogonal lateral direction Dd which corresponds to the short direction of the elements 324, 320 and perpendicular to the specific lateral direction Ds. On the above assumption, the center line Ci of the suction port 340 illustrated in FIG. 6 is deviated toward one end 324da in the orthogonal lateral direction Dd in the filter element 324 from a center 324dc in the orthogonal lateral direction Dd in the filter element 324. The position of the fuel pump 34 except the suction port 340 in the orthogonal lateral direction Dd may be any position according to specifications. Further, the position of the pressure regulating valve 36 in the orthogonal lateral direction Dd may also be any position according to the specifications.

As illustrated in FIGS. 1 to 4 and 8, a part of the lateral part of the lower member 321 in the cover element 320 forms a fuel reservoir wall 321c. The fuel reservoir wall 321c has an L-shaped cross section along the specific lateral direction Ds and the up-down direction. The fuel reservoir wall 321c covers the other end 324sb of the filter element 324 from the lateral and lower sides. The other end 324sb is located opposite to the one end 324sa located adjacent to the suction port 340 in the specific lateral direction Ds. Accordingly, the fuel reservoir wall 321c illustrated in FIG. 3 defines a fuel space 320b for immersing the other end 324sb of the filter element 324 in the fuel.

Figure 12:
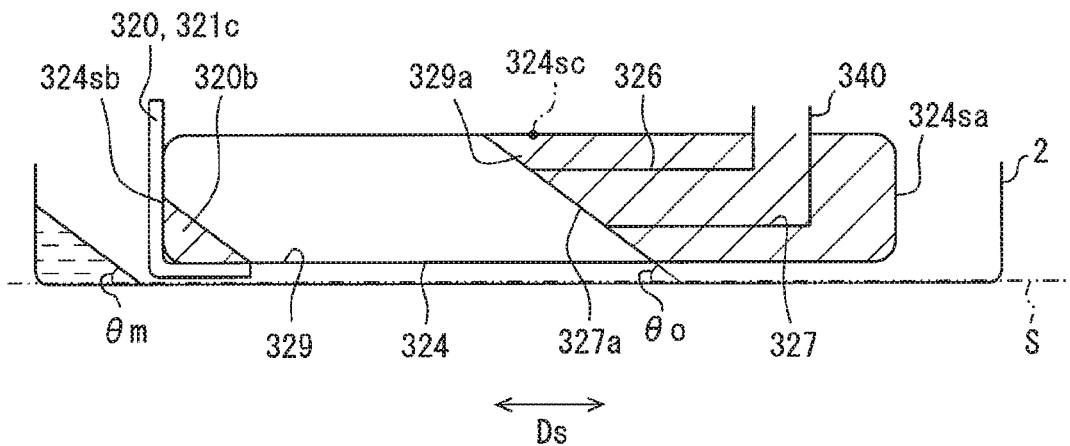
FIG. 12 is a schematic diagram for describing effects of the first embodiment.

An overlapping length L between the other end 324sb and the fuel reservoir wall 321c in the specific lateral direction Ds is set to a length that leaves an intended amount of fuel in the fuel space 320b at the maximum inclination assumed in the fuel level inside the fuel tank 2 with respect to the horizontal reference plane S in the specific lateral direction Ds. An overlapping height H between the other end 324sb and the fuel reservoir wall 321c in the up-down direction is set to a height that leaves the intended amount of fuel in the fuel space 320b at the maximum inclination assumed in the fuel level with respect to the horizontal reference plane S in the specific lateral direction Ds. The maximum inclination indicates a state in which a maximum inclination angle θm appears in an angle estimated when the side on which the fuel level is lowered corresponds to the one end 324sa side of the filter element 324 as illustrated in FIG. 12, in a cross section along the specific lateral direction Ds and the up-down direction. Further, the intended amount of fuel left in the fuel space 320b indicates an amount that substantially prevents exhaustion of fuel sucked into the suction port 340 even at the maximum inclination in the fuel level.

As illustrated in FIGS. 3, 5, and 9 to 11, the unit body 32 of the fuel supply apparatus 1 has a passage element 326 and a guide element 328 in addition to the filter element 324 and the cover element 320 described above.

The passage element 326 is made of resin. The passage element 326 has a flat rectangular tubular shape so as to define an inner passage 327 inside the fuel tank 2 and the filter element 324. The passage element 326 is held by the suction port 340 to extend with a center line Cp extending in the specific lateral direction Ds. The passage element 326 allows an entire outlet of the inner passage 327 to communicate with the suction port 340 adjacent to the one end 324sa of the filter element 324. The passage element 326 allows an entire inlet of the inner passage 327 to be open in the inner space 329 of the filter element 324 at a location adjacent to the center 324sc relative to the one end 324sa of the filter element 324. In FIGS. 3, 5, and 9 to 11, an opening 327a which forms the inlet of the inner passage 327 is substantially aligned with the center 324sc in the specific lateral direction Ds. However, the opening 327a may be deviated from the center 324sc.

In this manner, the opening 327a which is located opposite to the suction port 340 in the specific lateral direction Ds is inclined toward the suction port 340 in the specific lateral direction Ds from the upper side to the lower side. An inclination angle θo of the opening 327a illustrated in FIGS. 9 and 12 with respect to the horizontal reference plane S in the specific lateral direction Ds is set equal to or smaller than the maximum inclination angle θm.

According to the above configuration, the inner passage 327 extends from the suction port 340 toward the center 324sc of the filter element 324 and communicates with the inner space 329. Accordingly, the inner passage 327 is capable of introducing fuel from the inner space 329 to the suction port 340 where a suction pressure acts when the fuel pump 34 is in operation. Thus, a minimum value of the passage cross-sectional area of the inner passage 327 is set equal to or larger than a maximum value of the passage cross-sectional area of the suction port 340. The passage cross-sectional area of the inner passage 327 indicates an opening area in a cross section perpendicular to the center line Cp of the inner passage 327 illustrated in FIGS. 10 and 11 in a part except the opening 327a. Similarly, the passage cross-sectional area of the suction port 340 indicates an opening area in a cross section perpendicular to the center line Ci of the suction port 340 illustrated in FIGS. 3 and 5.

As illustrated in FIGS. 5 and 9 to 11, the guide element 328 is made of resin integrally with the passage element 326. The guide element 328 has a hard skeletal shape so as to partition the inner space 329 inside the fuel tank 2 and inside the filter element 324. The guide element 328 includes a base frame 323 and a holding stopper 325 which are combined together.

The base frame 323 having a trapezoidal frame shape surrounds the outer peripheral side of the passage element 326. Many holding stoppers 325 each having a beam shape are arranged side by side in the specific lateral direction Ds on the inner peripheral side of the base frame 323. Each of the holding stoppers 325 bridges two sides of the base frame 323, the two sides being opposed to each other in the orthogonal lateral direction Dd, directly or through the passage element 326. Each of the holding stoppers 325 holds the lower part of the filter element 324 from the upper side.

Among these holding stoppers 325, as illustrated in FIGS. 10 and 11, in particular, each of predetermined holding stoppers 325 located between the other end 324sb and the opening 327a in the specific lateral direction Ds includes a pair of inclined parts 325a. The inclined part 325a of each of the holding stoppers 325 is inclined toward the opening 327a in the specific lateral direction Ds from the outer side (that is, the side corresponding to the two opposed sides of the base frame 323) to the inner side in the orthogonal lateral direction Dd. The inclined shape of the inclined part 325a enables the guide element 328 to guide the fuel from the inner space 329 to the opening 327a which is located opposite to the suction port 340 in the inner passage 327.

Hereinbelow, effects of the first embodiment will be described.

Figure 13:
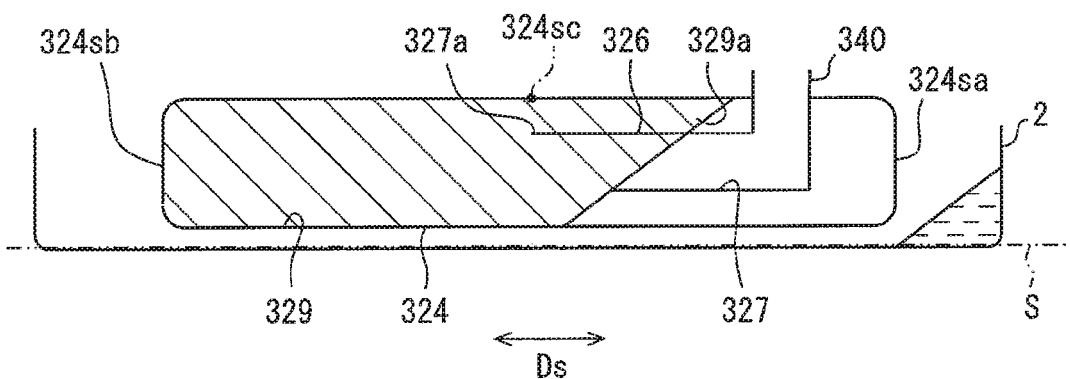
FIG. 13 is a schematic diagram for describing the effects of the first embodiment.

The inner passage 327 which is defined by the passage element 326 in the filter element 324 of the first embodiment extends from the suction port 340 of the fuel pump 34, which is deviated toward the one end 324sa in the specific lateral direction Ds, to the center 324sc in the specific lateral direction Ds, and is open in the inner space 329. Accordingly, when the entire filter element 324 is exposed as illustrated in FIGS. 12 and 13 from the fuel level inclined with respect to the specific lateral direction Ds, it is possible to reduce a size difference in a fuel suckable area 329a (the hatched part in FIGS. 12 and 13) which is limited to the side on which the fuel level is lowered in the specific lateral direction Ds in the inner space 329. This is based on that the size of the fuel suckable area 329a is determined according to the distance from a part on the center 324sc side where the inner passage 327 is open to each of the one end 324sa and the other end 324sb in the filter element 324 even when an inclination state of the fuel level with respect to the horizontal reference plane S changes in the specific lateral direction Ds. Accordingly, it is possible to secure fuel that can be sucked into the suction port 340 through the inner passage 327 to prevent exhaustion of the fuel that can be sucked. Thus, it is possible to prevent a fuel supply failure.

Further, in the inner passage 327 whose passage cross-sectional area is set equal to or larger than the passage cross-sectional area of the suction port 340 as described in the first embodiment, a pressure loss applied to fuel introduced into the suction port 340 can be reduced. Accordingly, when the entire filter element 324 is exposed as illustrated in FIGS. 12 and 13, a reduction in fuel suction efficiency caused by suction of fuel into the suction port 340 from the fuel suckable area 329a through the inner passage 327 is less likely to occur. Thus, it is possible not only to prevent a fuel supply failure, but also to ensure a high fuel supply efficiency.

Further, according to the first embodiment, the opening 327a which is located opposite to the suction port 340 in the inner passage 327 is inclined toward the suction port 340 from the upper side to the lower side. Accordingly, as illustrated in FIGS. 12 and 13, it is possible to ensure a large size of the fuel suckable area 329a which is limited to the side on which the fuel level is lowered relative to the opening 327a of the inner passage 327 in the inner space 329 regardless of a change in the inclination state of the fuel level. Thus, it is possible to maintain a secured state of fuel that can be sucked into the suction port 340 to prevent a fuel supply failure.

Further, according to the first embodiment, the inclination angle θo of the opening 327a with respect to the specific lateral direction Ds is set equal to or smaller than the maximum inclination angle θm assumed in the fuel level inside the fuel tank 2 with respect to the specific lateral direction Ds. Accordingly, it is possible to reliably ensure a large size of the fuel suckable area 329a which is limited to the side on which the fuel level is lowered relative to the opening 327a, in particular, even at the maximum inclination where the lowered side corresponds to the one end 324sa of the filter element 324 as illustrated in FIG. 12. Thus, it is possible to increase fuel that can be sucked into the suction port 340 as soon as possible to increase the effect of preventing a fuel supply failure.

Further, the inner space 329 of the first embodiment is partitioned by the guide element 328 which guides the fuel to the opening 327a which is located opposite to the suction port 340 in the inner passage 327. Accordingly, in the fuel suckable area 329a limited to the other end 324sb side in the specific lateral direction Ds in the filter element 324 which is entirely exposed from the inclined fuel level as illustrated in FIG. 13, air sucked from the outside of the filter element 324 with fuel suction into the suction port 340 can be temporarily captured by the guide element 328. As the inclination of the fuel level is cancelled or becomes gentle, it becomes easy for the air captured in this manner to flow into the opening 327a of the inner passage 327. Thus, it is possible to prevent exhaustion of the fuel itself caused by air continuously trapped in the inner space 329. Thus, it is possible to prevent a fuel supply failure resulting from the fuel exhaustion.

Further, in the filter element 324 of the first embodiment, the fuel pump 34 and the pressure regulating valve 36 located on the discharge side of the fuel pump 34 are respectively disposed in a deviated manner on the one end 324sa side and the other end 324sb side in the specific lateral direction Ds. In the inner passage 327 under such a disposition configuration, deviated disposition of the suction port 340 is unavoidable as illustrated in FIG. 1 on the one end 324sa side which is opposite to the side to which the pressure regulating valve 36 is deviated in the filter element 324. However, according to the inner passage 327 as described above, it is possible to secure fuel that can be sucked into the suction port 340 to prevent a fuel supply failure.

As described in the first embodiment, the suction port 340 is deviated in the specific lateral direction Ds which corresponds to the longitudinal direction of the bag-shaped filter element 324. Thus, if the inner passage 327 is not present, a size difference in the fuel suckable area 329a which is increased or reduced according to a change in the inclination state of the fuel level as illustrated in FIGS. 12 and 13 may be disadvantageously increased. However, according to the inner passage 327 as described above, even when the inclination state of the fuel level changes with respect to the longitudinal direction of the filter element 324, the size difference in the fuel suckable area 329a can be reduced. Thus, it is possible to secure fuel that can be sucked into the suction port 340 to prevent a fuel supply failure.

Further, according to the first embodiment, the other end 324sb which is located opposite to the suction port 340 in the specific lateral direction Ds in the filter element 324 is covered with the cover element 320 (in particular, the fuel reservoir wall 321c in the first embodiment). Accordingly, the fuel space 320b for immersing the other end 324sb in the fuel is defined. In such a configuration, the overlapping length L between the filter element 324 and the cover element 320 in the specific lateral direction Ds is set to a length that leaves fuel in the fuel space 320b at the maximum inclination assumed in the fuel level inside the fuel tank 2 with respect to the specific lateral direction Ds illustrated in FIG. 12. Accordingly, although the entire filter element 324 is exposed from fuel whose liquid level is inclined at the maximum, a part of the filter element 324 remains immersed in the fuel left in the fuel space 320b. As a result, the fuel can be sucked into the suction port 340 also from the fuel space 320b which is located on the other end 324sb side opposite to the fuel suckable area 329a which is located on the one end 324sa side in the specific lateral direction Ds. Thus, it is possible to increase fuel that can be sucked into the suction port 340 to increase the effect of preventing a fuel supply failure.

Second Embodiment

Figure 14:
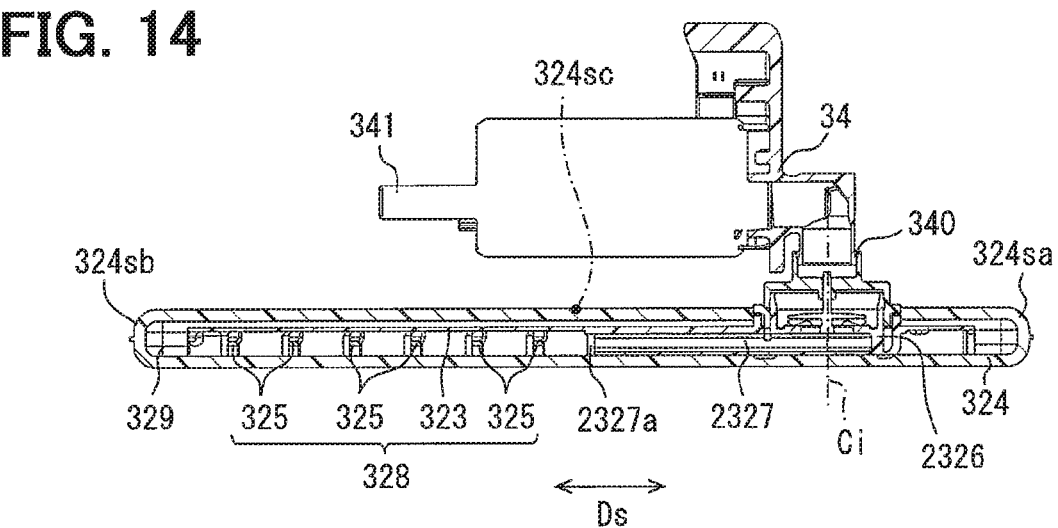
FIG. 14 is a sectional view of a filter element and a fuel pump of a second embodiment.
Figure 15:
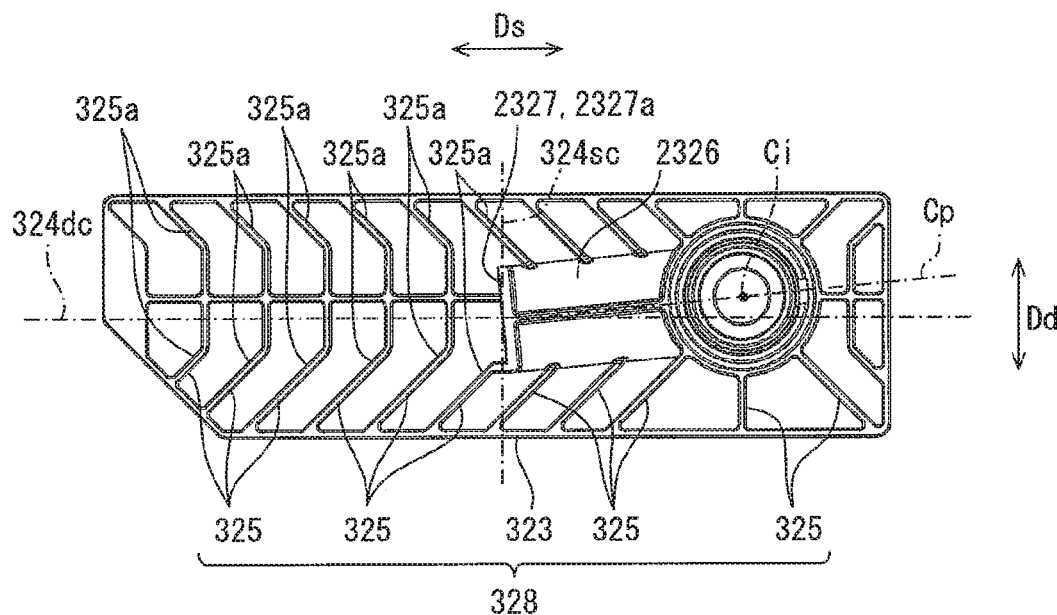
FIG. 15 is a top view of the filter element of the second embodiment.
Figure 16:
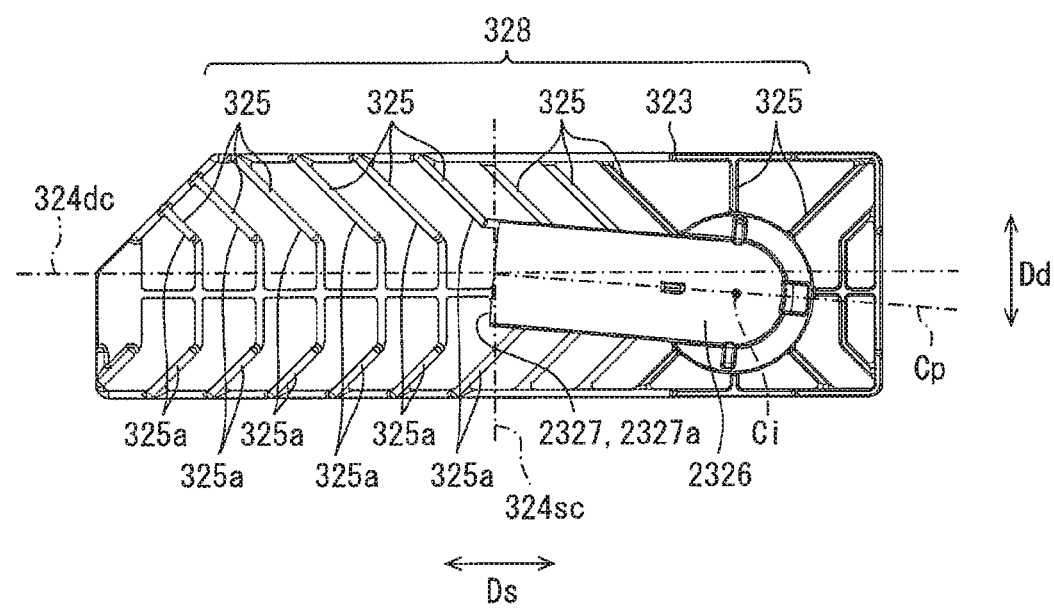
FIG. 16 is a bottom view of the filter element of the second embodiment.

As illustrated in FIGS. 14 to 16, a second embodiment is a modification of the first embodiment.

A passage element 2326 of the second embodiment extends with a center line Cp extending in a direction inclined with respect to a specific lateral direction Ds and an orthogonal lateral direction Dd. Accordingly, an inner passage 2327 defined by the passage element 2326 extends from a suction port 340 toward a center 324sc in the specific lateral direction Ds and a center 324dc in the orthogonal lateral direction Dd in a filter element 324.

The suction port 340 is deviated toward one end 324sa of the filter element 324 in the specific lateral direction Ds and toward one end 324da of the filter element 324 in the orthogonal lateral direction Dd in a manner similar to the first embodiment. However, an opening 2327a of the inner passage 2327 located opposite to the suction port 340 may be substantially perpendicular to a horizontal reference plane S as illustrated in FIG. 14 or may be inclined with respect to the horizontal reference plane S. The second embodiment is substantially similar to the first embodiment except the configuration described above.

In this manner, in the filter element 324 of the second embodiment, the suction port 340 is deviated toward the one end 324sa in the specific lateral direction Ds and toward the one end 324da in the orthogonal lateral direction Dd, that is, to the one end 324sa side in the longitudinal direction and the one end 324da side in the short direction. Further, in the filter element 324 of the second embodiment, the inner passage 2327 extends from the suction port 340 toward the center 324sc in the specific lateral direction Ds and the center 324dc in the orthogonal lateral direction Dd, that is, toward the center 324sc in the longitudinal direction and the center 324dc in the short direction. Accordingly, even when the inclination state of the fuel level changes in the short direction of the filter element 324, it is possible to secure fuel that can be sucked into the suction port 340 in a manner similar to the case where the inclination state changes in the longitudinal direction as described above. Thus, it is possible to increase the effect of preventing a fuel supply failure.

Other Embodiment

It should be appreciated that the present disclosure is not limited to the embodiments described above and can be modified appropriately within the scope of the appended claims. The embodiments above are not irrelevant to one another and can be combined appropriately unless a combination is obviously impossible.

Specifically, in a first modification relating to the first and second embodiments, the passage cross-sectional area of the inner passages 327, 2327 may be set smaller than the passage cross-sectional area of the suction port 340. In a second modification relating to the first embodiment, the opening 327a of the inner passage 327 located opposite to the suction port 340 need not be inclined and may be, for example, substantially perpendicular to the specific lateral direction Ds. In a third modification relating to the first embodiment, the inclination angle θo of the opening 327a in the inner passage 327 may be set larger than the maximum inclination angle θm.

In a fourth modification relating to the first and second embodiments, the holding stopper 325 including the inclined part 325a need not be provided. In a fifth modification relating to the first and second embodiments, the pressure regulating valve 36 need not be deviated toward the other end 324sb in the specific lateral direction Ds in the filter element 324.

In a sixth modification relating to the first and second embodiments, the filter element 324 may be disposed in a manner that the short direction corresponds to the specific lateral direction Ds. In a seventh modification relating to the first and second embodiments, the filter element 324 may have an outline other than a trapezoidal outline, for example, a square outline in both plan view from the upper side and plan view from the lower side. In the case of the square outline, the specific lateral direction Ds may be set to an extending direction of any two opposed sides.

In an eighth modification relating to the first and second embodiments, the fuel reservoir wall 321c need not be formed on the lateral side of the lower member 321 in the cover element 320. In a ninth modification relating to the first and second embodiments, the passage elements 326, 2326 and the guide element 328 may be separately formed.

What is claimed is:

1. A fuel supply apparatus that supplies fuel from a fuel tank in a vehicle, the fuel supply apparatus comprising:
   a fuel pump transversely arranged inside the fuel tank to discharge fuel sucked from a suction port;
   a filter element that defines an inner space communicated with the suction port inside the fuel tank to filter the fuel passing toward the inner space;
   a pressure regulating valve configured to regulate a pressure of fuel discharged from the fuel pump; and
   a passage element that defines an inner passage inside the fuel tank to introduce the fuel from the inner space into the suction port through the inner passage, wherein
   the suction port is located to be deviated toward one end of the filter element in a specific lateral direction which is parallel to a tank lid,
   the inner passage is communicated with the inner space,
   the inner passage extends from the suction port toward a center of the filter element in the specific lateral direction,
   the pressure regulating valve is located adjacent to a discharge port directly connected to the fuel pump, and
   the fuel pump is arranged such that a longitudinal direction of the fuel pump is coincident with the specific lateral direction.

2. The fuel supply apparatus according to claim 1, wherein a passage cross-sectional area of the inner passage is set larger than or equal to a passage cross-sectional area of the suction port.

3. The fuel supply apparatus according to claim 1, wherein the inner passage has an opening opposite to the suction port, and the opening is inclined toward the suction port as going downward.

4. The fuel supply apparatus according to claim 3, wherein an inclination angle of the opening with respect to the specific lateral direction is set smaller than or equal to an assumed maximum inclination angle of a fuel level with respect to the specific lateral direction inside the fuel tank.

5. The fuel supply apparatus according to claim 1, further comprising a guide element that partitions the inner space and guides the fuel from the inner space to an opening of the inner passage opposite to the suction port.

6. The fuel supply apparatus according to claim 1, wherein
   the fuel pump is deviated toward the one end of the filter element in the specific lateral direction, and
   the pressure regulating valve is deviated toward the other end of the filter element in the specific lateral direction.

7. The fuel supply apparatus according to claim 1, wherein the filter element is formed in a flat rectangular shape whose longitudinal direction corresponds to the specific lateral direction.

8. The fuel supply apparatus according to claim 7, wherein
   the suction port is deviated toward the one end of the filter element in the specific lateral direction and deviated toward one end of the filter element in an orthogonal lateral direction perpendicular to the specific lateral direction, and
   the inner passage extends from the suction port toward the center of the filter element in the specific lateral direction and toward a center of the filter element in the orthogonal lateral direction.

9. The fuel supply apparatus according to claim 1, further comprising a cover element disposed to cover the other end of the filter element in the specific lateral direction inside the fuel tank, wherein the cover element defines a fuel space for immersing the other end of the filter element in the fuel, wherein
   an overlapping length between the filter element and the cover element in the specific lateral direction is set to a length that leaves the fuel in the fuel space at an assumed maximum inclination of a fuel level inside the fuel tank with respect to the specific lateral direction.

10. The fuel supply apparatus according to claim 1, wherein the pressure regulating valve is located closer to the discharge port than the suction port in the longitudinal direction of the fuel pump.

11. The fuel supply apparatus according to claim 1, wherein
   the fuel pump is deviated toward the one end of the filter element in the longitudinal direction of the fuel pump, and
   the pressure regulating valve is deviated toward the other end of the filter element in the longitudinal direction of the fuel pump.

12. The fuel supply apparatus according to claim 1, wherein
   the fuel pump is arranged such that the longitudinal direction of the fuel pump is perpendicular to a thickness direction of the filter element.

* * * * *